United States Patent [19]

Campbell

[11] Patent Number: 5,032,212

[45] Date of Patent: Jul. 16, 1991

[54] PETROLEUM CONTAINMENT BARRIER, APPARATUS FOR THE MANUFACTURE THEREOF AND METHOD AND APPARATUS FOR RECOVERING FLOATING PETROLEUM

[76] Inventor: Colin G. Campbell, P.O. Box 38, Sugar Hill, N.H. 03585

[21] Appl. No.: 341,581

[22] Filed: Apr. 21, 1989

[51] Int. Cl.$^5$ ............................................. B29D 23/00
[52] U.S. Cl. ...................................... 156/466; 405/63; 405/72
[58] Field of Search ........................ 405/63, 64, 65, 66, 405/68, 72, 71, 70; 156/290, 213, 218, 227, 466, 145, 198

[56] References Cited

U.S. PATENT DOCUMENTS

| Re. 30,438 | 11/1980 | Preus ................................. 405/68 |
| --- | --- | --- |
| 3,369,664 | 2/1968 | Dahan ............................... 405/68 |
| 3,511,435 | 5/1970 | Hewitt et al. ................. 156/218 X |
| 3,563,036 | 2/1971 | Smith et al. .................. 405/72 X |
| 3,575,757 | 4/1971 | Smith ............................. 156/145 X |
| 3,577,879 | 5/1971 | Ducrocq ........................... 405/72 |
| 3,580,788 | 5/1971 | Gustafson ........................ 156/466 |
| 3,613,377 | 10/1971 | Zaugg ............................... 405/63 |
| 3,703,811 | 11/1972 | Smith ............................... 405/68 |
| 3,768,656 | 10/1973 | Nugent . |
| 3,792,589 | 2/1974 | Sayles .............................. 405/68 |
| 3,849,989 | 11/1974 | Preus ............................... 405/68 |
| 3,901,753 | 8/1975 | Öberg ........................... 156/218 X |
| 3,901,753 | 8/1975 | Oberg . |
| 3,919,027 | 11/1975 | Jones ............................ 156/218 X |
| 3,984,987 | 10/1976 | Light ............................... 405/63 |
| 4,006,082 | 2/1977 | Irons . |
| 4,089,178 | 5/1978 | Kinase et al. .................... 405/66 |
| 4,096,700 | 6/1978 | Muramatsu et al. ............. 405/63 |
| 4,116,007 | 9/1978 | Stagemeyer et al. ............. 405/66 |
| 4,190,381 | 2/1980 | Knaus et al. ................. 405/63 X |
| 4,490,962 | 1/1985 | Weis et al. .................. 156/466 X |
| 4,564,407 | 1/1986 | Tsuruta . |
| 4,640,645 | 2/1987 | Simpson et al. ................. 405/63 |
| 4,882,073 | 11/1989 | Griffith . |

FOREIGN PATENT DOCUMENTS

| 2712459 | 9/1978 | Fed. Rep. of Germany ........ 405/63 |
| --- | --- | --- |
| 1403611 | 8/1975 | United Kingdom ................. 405/64 |

Primary Examiner—Dennis L. Taylor
Attorney, Agent, or Firm—Davis, Bujold & Streck

[57] ABSTRACT

The present invention relates to a continuous containment barrier comprising a plurality of compartmentalized inflatable chambers having, attached to the bottom thereof, an impermeable keel which stabilizes the containment barrier and assists in containment of the spilled petroleum product even under turbulent conditions. Extending below the keel is an elongate skirt which has a plurality of apertures therein that provide the necessary water pressure relief while still maintaining the necessary strength for successful containment of a spilled petroleum product. The barrier is designed to develop a desired height of petroleum product floating on an aqueous environment so that efficient recovery can occur. The invention additionally relates to apparatus for continuously manufacturing, inflating, and ballasting a custom length containment barrier so that virtually any petroleum spill can be completely enclosed by the containment barrier, and further relates to apparatus for positively controlling the containment and recovery of the petroleum contained therein. The invention also relates to a method for recovering a petroleum product floating on water.

5 Claims, 13 Drawing Sheets

PETROLEUM CONTAINMENT BARRIER, APPARATUS FOR THE MANUFACTURE THEREOF AND METHOD AND APPARATUS FOR RECOVERING FLOATING PETROLEUM

The present invention relates to an improved petroleum containment barrier which can be manufactured on-site quickly and efficiently to completely surround and enclose virtually any petroleum spill in an aqueous environment and further relates to an apparatus for the manufacture the barrier. Additionally, the present invention relates to a mobile petroleum recovery apparatus which can be quickly deployed to an accident site and attached to a ship and used to develop a desired height of petroleum product so that efficient pumping of the spilled petroleum product floating on the water can be obtained and further relates to a method for achieving the same.

BACKGROUND OF THE INVENTION

There is yet to be available mobile petroleum recovery equipment which can be rapidly deployed at a petroleum spill accident so that the spilled petroleum product can be quickly, efficiently and cost effectively recovered from the sea, or other aqueous environment. Moreover, the recovery equipment and techniques presently available have serious drawbacks in that they are only useful for certain aspects of petroleum containment and recovery and they are all labor intensive and relatively inefficient.

The term "petroleum" means crude oil and all fluid derivatives thereof including gasoline, jet fuel, home heating oils, etc. and also includes other liquids which have a specific gravity less than water so that they float.

BRIEF DESCRIPTION OF THE PRIOR ART

The following equipment and techniques are currently available for containment and recovery of spilled petroleum products from an aqueous environment. The first relates to petroleum containment which is achieved simply by inflating tubular floatation devices called "booms". These containment barrier devices heretofore have only performed reasonably well in calm seas. When swells are present in the water or the weather becomes severe, the containment provided by such devices is compromised and a significant portion of the petroleum product can leak past the barrier and thus be free floating in the environment. In an effort to improve the containment ability of these floatation devices, some have been provided with skirts which extend into the marine environment to help contain the petroleum spill below the surface. Such skirts are passive devices and add little if anything to the stabilization of the floatation devices. In addition, such floatation devices are typically transported to the site where they are manually inflated and manually deployed into the water by clean-up personnel.

A couple of known petroleum recovery techniques for recovering floating petroleum are either dipping out product with ladle-like devices or skimming the water surface with net-like skimmers. In addition, some special ships have been designed to skim the surface of water as they travel through it to remove a portion of the floating petroleum product. One such ship has a continuous rotating belt which absorbs spilled petroleum product and conveys it to press rollers which squeeze the absorbed petroleum product from the belt into the ship's storage compartment. There are also variants of the above techniques which allow skimming or removal by the ship while it remains stationary.

When the contamination problem is very severe and/or the recovery efforts do not significantly improve the situation, recovery may be abandoned and chemical "dispersants" can be sprayed onto the spilled petroleum product to break it up and cause it to sink to the bottom of that body of water where it is eventually degraded by micro-organisms. Another technique, which does not involve recovery, is to burn the petroleum product off the surface of the water using lasers or other heating devices which set the petroleum afire.

Petroleum recovery can also be achieved on shore by employing tank trucks and excavating equipment to vacuum up and/or remove as much petroleum product as is reasonably possible from the shore.

All known prior art recovery apparatus, methods and techniques are very labor intensive and do not employ much, if any, automated or high-tech equipment to render the petroleum containment and recovery process more efficient.

SUMMARY OF THE INVENTION

Therefore, it is an object of the present invention to improve upon the present petroleum recovery equipment and techniques so that virtually all "spilled" petroleum product can be recovered from an aqueous environment.

Another object of the invention is to provide an improved floatation barrier which can be quickly manufactured to any desired length on-site so that the spilled petroleum product can be completely enclosed by the containment barrier.

A still further object of the invention is to provide an improved floatation barrier which can be used to generate a desired height (head) of the petroleum product floating on the water and control that height to maximize recovery.

A further object of the invention is to provide a self-contained barrier deployment apparatus which can be rapidly deployed to the petroleum spill to minimize the surface area being contaminated by the petroleum product.

An additional object of the invention is to provide a system that can be stored in a state of readiness and deployed by air on short notice thereby resulting in quick, efficient and cost-effective recovery of the petroleum product from an aqueous environment.

Another object of the invention is to provide petroleum recovery equipment which can generate a sufficient head of the petroleum product floating on the water so that the petroleum product can be efficiently pumped during recovery, rather than skimmed off the surface.

An object of the invention is to provide a system whereby the thickness of the petroleum product floating on the water is controlled by the deployed containment so that recovery is efficiently achieved.

A still further object of the invention is to provide a petroleum product recovery system which can be customized to enclose virtually any petroleum spill, establish a positive control over the spill and immediately begin recovering the spilled product in a manner which recovers the petroleum product in a reusable and/or resalable condition.

Briefly, in accordance with the invention, there is provided a floatation containment barrier, for containing floating petroleum on water, comprising elongate buoyancy means for providing floatation of the containment barrier when in use, elongate keel means, an elongate portion of which is impermeable for preventing the flow of fluid therethrough, and weight means for maintaining said keel means in a vertical position when the barrier is in use, wherein said buoyancy means are attached to an elongate edge of the impermeable portion of the keel means and said weight means are attached to an opposite elongate edge of the keel means, said impermeable portion is of a width to assist said containment barrier in developing a desired head of petroleum product floating on the water.

A recovery apparatus, for recovering petroleum floating on the surface of water, comprising winching means positioned adjacent the water surface for winching in a floating containment barrier, encompassing said petroleum, in a controlled manner, and means for collecting and pumping said petroleum product floating on the water to storage means.

An apparatus for manufacturing a continuous containment barrier comprising supply means for supplying a continuous strip of weldable material, conveying means for conveying said strip along the apparatus, folding means for folding one edge of said strip upon itself, seaming means for forming an elongate air tight seam along the folded over edge of said strip to form a tubular portion, aperture producing means for providing a series of apertures in said strip remote from said tubular portion, inflation means extending into the folded over edge of said strip for inflating and pressurizing said tubular portion, seaming means for forming air tight transverse seams in the inflated tubular portion at discrete intervals thereby forming a plurality of inflated compartments, and means for attaching weights to the edge of said strip remote from the inflated compartments.

A method of recovering petroleum floating on water comprising the steps of positioning a continuous floatation barrier to encompass said petroleum, reducing the area encompassed thereby to develop a desired head of petroleum, collecting said petroleum in a storage means once said desired head has been developed.

DESCRIPTION OF THE DRAWINGS

The above and other objects of the invention will be further understood by having reference to the accompanying drawings which illustrate, by way of example, a preferred embodiment of the present invention, it being understood that other embodiments employing the same principles may be made as will be readily apparent to those skilled in the art.

In the drawings:

FIG. 7 is a side elevation showing a diagrammatic representation of the containment barrier control roller assembly of the present invention;

DESCRIPTION OF THE INVENTION

In order to make the present invention rapidly deployable, it is anticipated that the containment deployment apparatus and the petroleum recovery apparatus are completely contained within containerized freight containers. Accompanying each freight container carrying one such apparatus is a support container which contains all of the necessary power generators, fuel, and electrical and hydraulic equipment necessary to power the apparatus. Such containerized freight containers facilitate shipment of the recovery apparatus over any available common carrier, such as by Hercules 100-30 civilian aircraft and/or Sikorski S-64 Skycrane, or by military shipping aircraft.

Figure 1:
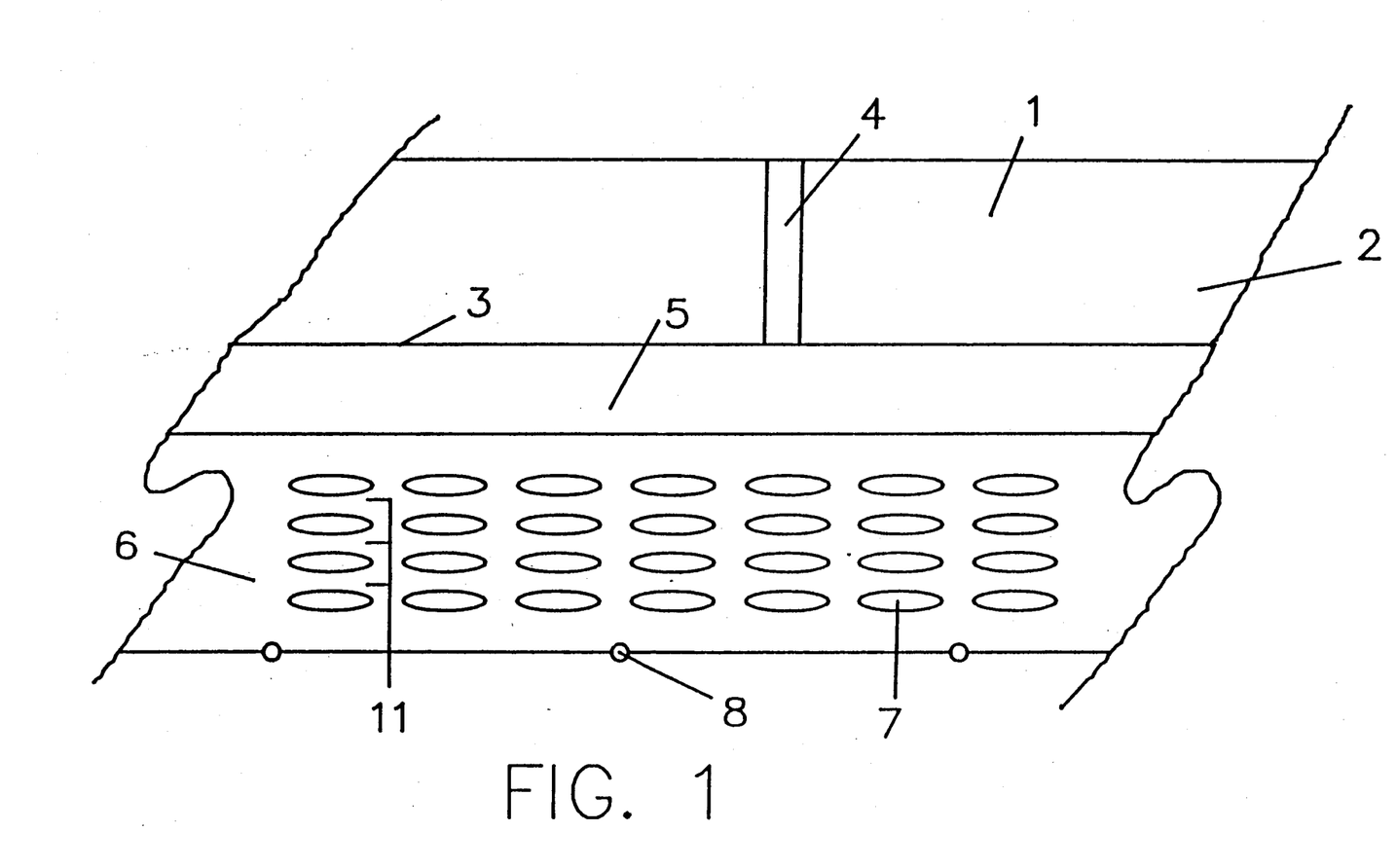
FIG. 1 is a partial side elevation of the improved containment barrier of the present invention.
Figure 2:
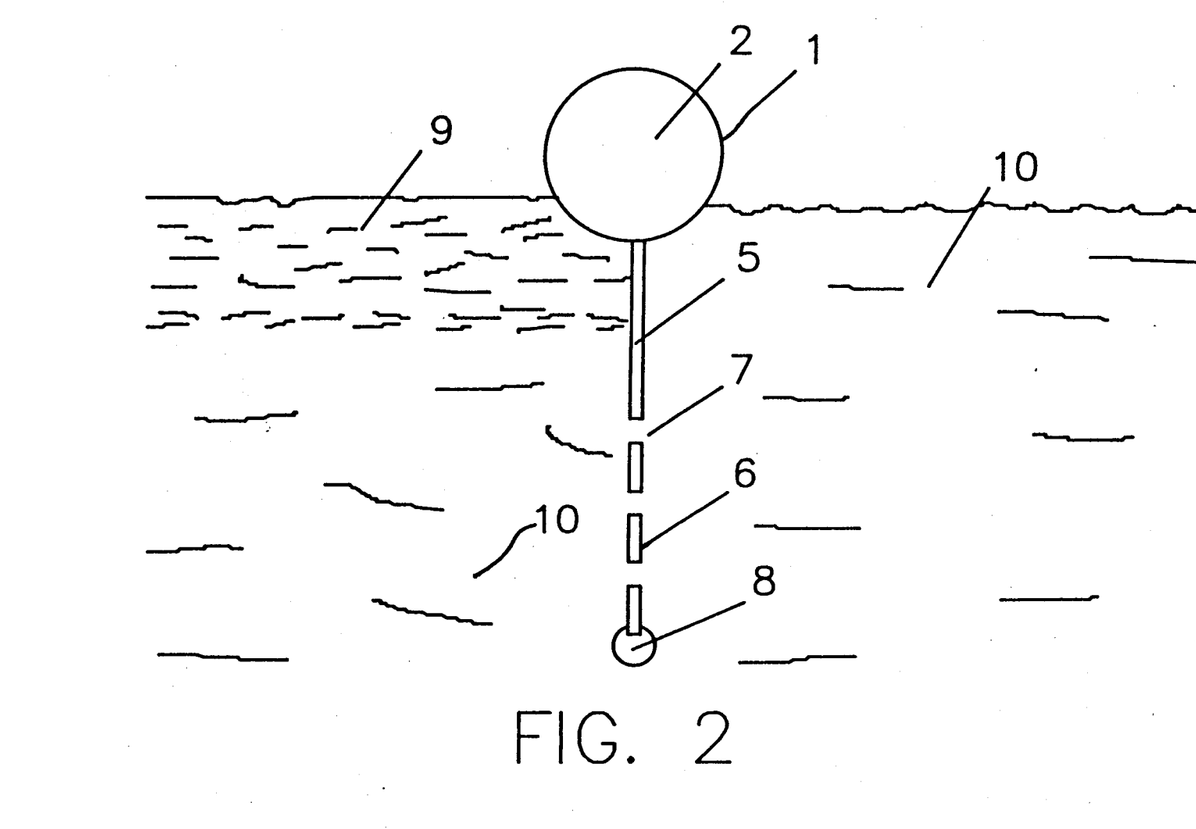
FIG. 2 is a cross-sectional view of the improved containment barrier of the present invention shown in use.

Turning now to FIGS. 1 and 2, the improved containment barrier 1 of the present invention will now be described in detail. The containment barrier 1 is compartmentalized to form a series of inflated chambers 2, the length and width of each of which is defined by the positions of elongate seam 3 and traverse seams 4. These seams are air-tight and produced thermally, chemically, ultrasonically, etc., and they insure that the inflatable chambers 2 maintain the necessary air pressure during use. The inflatable chamber 2, when inflated, will have approximately an 18 inch diameter and provide the necessary floatation of the containment barrier 1. The compartmentalized arrangement of the inflatable chambers 2 assures that containment barrier 1 remains floating even in the event that one or more of the inflated chambers were to become deflated for some reason.

Attached to the seam 3 of the containment barrier 1 is an impermeable elongate keel 5 which extends along the entire length of the containment barrier 1. The purpose of the keel is to assist in the containment and isolation of the floating spilled petroleum product 9 even under rough conditions and, at the same time, provide stabilization of the containment barrier 1. The keel also prevents petroleum product from flowing under the inflated chambers and assists in generating an increased head of spilled petroleum product. The developed head will be a somewhat depressed head depending upon the specific gravity of the petroleum product. The desired maximum depth of the contained petroleum product 9 (see FIG. 2) is believed to be approximately 12 inches under normal conditions.

The keel 5 is preferably between approximately 2 and 12 inches wide. Extending below the keel 5 of the containment barrier is an approximately 24 inch wide elongate skirt 6. The skirt provides a major portion of the overall strength necessary for successful control of the spilled petroleum product height and the skirt's width can be varied depending on the strength requirements. The skirt 6 is provided with a plurality of apertures or holes 7 punched through it to allow free movement of the water 10 located below the spilled petroleum product 9 to pass through the skirt. This movement assures minimum hydrostatic pressure on the containment barrier 1 while also helping to maintain a controlled spilled petroleum product height. The skirt 6 is provided with a plurality of elongate reinforcing strips 11, i.e., elongate strips running parallel to the inflatable chambers which do not having any holes therein, which provide the necessary longitudinal strength of the barrier. The inflatable chamber, keel and skirt can be manufactured from one piece of material or two or more pieces connected to one another.

Attached to the bottom of the skirt 6, at spaced intervals, are ballast weights 8 which are typically provided every 2 to 4 feet or so, depending on their weight, size, etc., to prevent sailing of the skirt and keel when those members are subjected to water currents and movement. Additionally, the ballast weights 8 maintain the vertical orientation of the keel 5 which helps assure that an increased head (height) of spilled petroleum product is generated and maintained under rough sea conditions.

Figure 3:
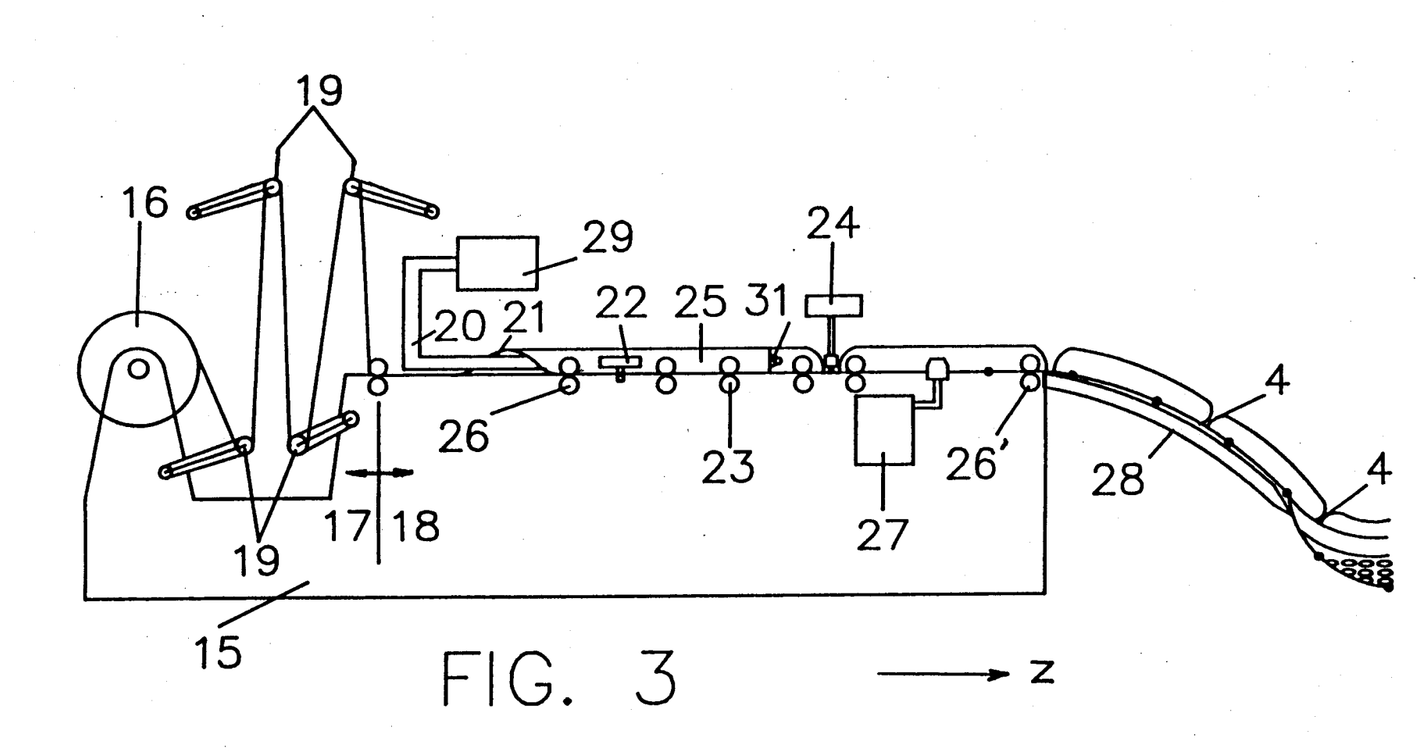
FIG. 3 is an elevation showing a diagrammatic representation of an apparatus for manufacturing the improved containment barrier of FIG. 1.
Figure 4:
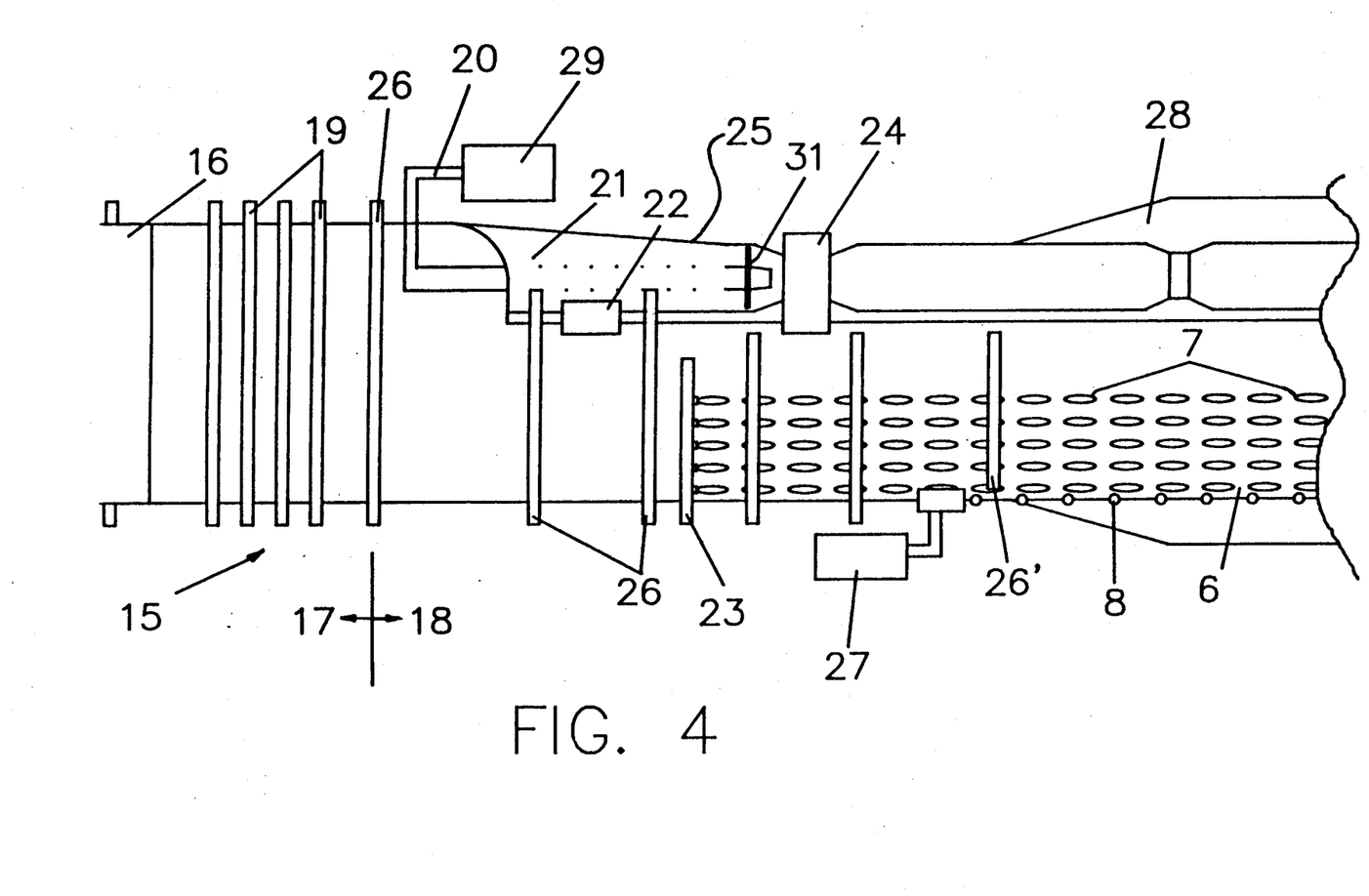
FIG. 4 is a plan view showing a diagrammatic representation of the manufacturing apparatus shown in FIG. 3.

Having now described the containment barrier 1 in detail, reference will now be had to FIGS. 3 and 4 where the preferred embodiment of an apparatus for manufacturing such a containment barrier is shown diagrammatically. The containment barrier deployment apparatus 15 is provided with a continuous roll of bondable material 16, either thermally, ultrasonically, chemically, etc., preferably 72 inch wide and between 1 to 10 mil thick polyester film, such as type 850 and type 851 polyester. In addition, other materials which have been modified through known methods to be chemically, thermally and/or ultrasonically bondable are also acceptable. The first section 17 of the apparatus 15 operates in a continuous production mode while the second section 18 of the apparatus operates slightly faster but in an "intermittent" fashion, i.e., it stops periodically for a very short duration. The first section 17 is provided with an accumulator in the form of a plurality of articulated idler rolls 19 which increase the path of unwound bondable material 16, when the second section 18 of the apparatus is stopped, so that the additional unwound material is taken up.

As the bondable material 16 is conveyed past a burst injection tube 20, the function of this device to be explained later in detail, it enters into a folding station 21 where the left-hand edge of the material 16, viewing FIGS. 3 and 4 in the direction of arrow Z, is folded over onto itself with the burst injector tube 20 positioned therebetween. The folded over material is then passed through an elongate seaming station 22, such as an ultrasonic or thermal seaming device, where a 1 inch wide welded seam is formed in the machine direction along the folded over edge to thereby form an elongate tubular section 25. After leaving the elongate seaming station 22, the tubular section 25 is conveyed towards a traverse seaming station 24, such as a second ultrasonic or thermal seaming device, where a traverse seam 4 is formed. If desired, a third manual seamer, such as an ultrasonic or thermal seamer, may be positioned near the continuous roll of bondable material 16 so that the ends of two successive rolls can be seamed together.

The elongate seam 3 is very important and it helps to substantially increase the elongate strength of the containment barrier due to its increased thickness. If a very large spill is to be contained, e.g., a spill covering over say over 5 square miles, it may be desireable to add an additional layer or layers of bondable material between the seam and/or increase the width of the seam to further improve upon the elongate strength of the containment barrier 1. After the inflatable chamber 2 leaves the elongate seaming station 22, the right-hand portion of the containment barrier 1 passes through a cutting device 23, which typically consists of a mating die and punch roller arrangement, to provide the necessary holes or apertures 7 in the skirt 6 of the containment barrier 1. Such cutting operations are well-known and thus are not described in further detail.

It is important to note that from the folding station 21 to the traverse seaming station 24 the burst injection tube 20 has been continuously positioned inside the tubular section 26 so that inflation of the tubular section can be achieved on line. When approximately 10 feet of manufactured product has passed downstream of the exhaust end of the burst injection tube 20, or any other desired length, conveying rollers 26, 26' are momentarily stopped while idler rollers 19 take up the excess conveyed material. When this occurs, a controlled burst of pressurized air from air supply 29 flows through injection tube 20 inside tubular section 25 of the containment barrier and inflates the section to approximately 5 PSIG or any other suitable pressure. It should be noted that the discharge end of the injection tube 20 is provided with a baffle 31, preferably a circular baffle having smooth outer edges, which helps to maintain the desired pressurization of the tubular section 25 until the transverse seam can be applied. Alternatively, the injection tube can have a slightly smaller diameter than the tubular portion 25 to help maintain the pressurization. After the desired pressure is achieved and maintained, transverse seaming station 24 applies a transverse seam, thereafter the conveying mechanism of the second section 18 is again started. It is desired that the inflation/welding step should occur relatively quickly, say on the order of approximately 750 milliseconds, so that the associated inflation/welding equipment should be chosen accordingly.

The final step is the attachment of ballast weights 8 which is achieved at ballast station 27. The ballast weights 8 are typically split alloy weights which are automatically clamped at any desired interval to the bottom edge of the skirt 6. The weights are preferably long and slender in shape so that they do not interfere with the winching devices when the containment barrier is "winched-in". It should be noted that the last set of conveying rollers 26' contacts only the middle portion of the containment barrier 1 to assure the required clearance on both edges, i.e., clearance for the attached ballast weights 8 and the inflated chambers 2, and positively deploys the containment barrier 1 into the water. A discharge slide 28 is provided to insure that the containment barrier 1 will be deployed smoothly into the water without interference with the ship's rudders or other external components.

It is also possible that the first and second section 17, 18 could both be run in an "intermittent" fashion whereby the entire apparatus 15 would be stop while the traverse welding and/or ballasting occurs. Alternatively, the entire apparatus 15 could be run continuously by using a moveable transverse seaming station which would be conveyed in the machine direction during welding and then returned back to its original position for a subsequent weld.

The containment barrier deployment apparatus 15 is typically put into operation on the stern of a conventional ship. Alternatively, the ship may be provided with a platform which the apparatus could be positioned and operated at a level slightly above the water level. Once fabrication of the containment barrier commences, the ship carrying the apparatus circumnavigates the petroleum spill and the containment barrier is discharged directed into the water from behind the ship as it travels.

Having now described the containment barrier and apparatus for manufacturing the same, reference will now be had to FIGS. 5 through 11 where the petroleum recovery 15 apparatus 35 is shown in detail.

Figure 5:
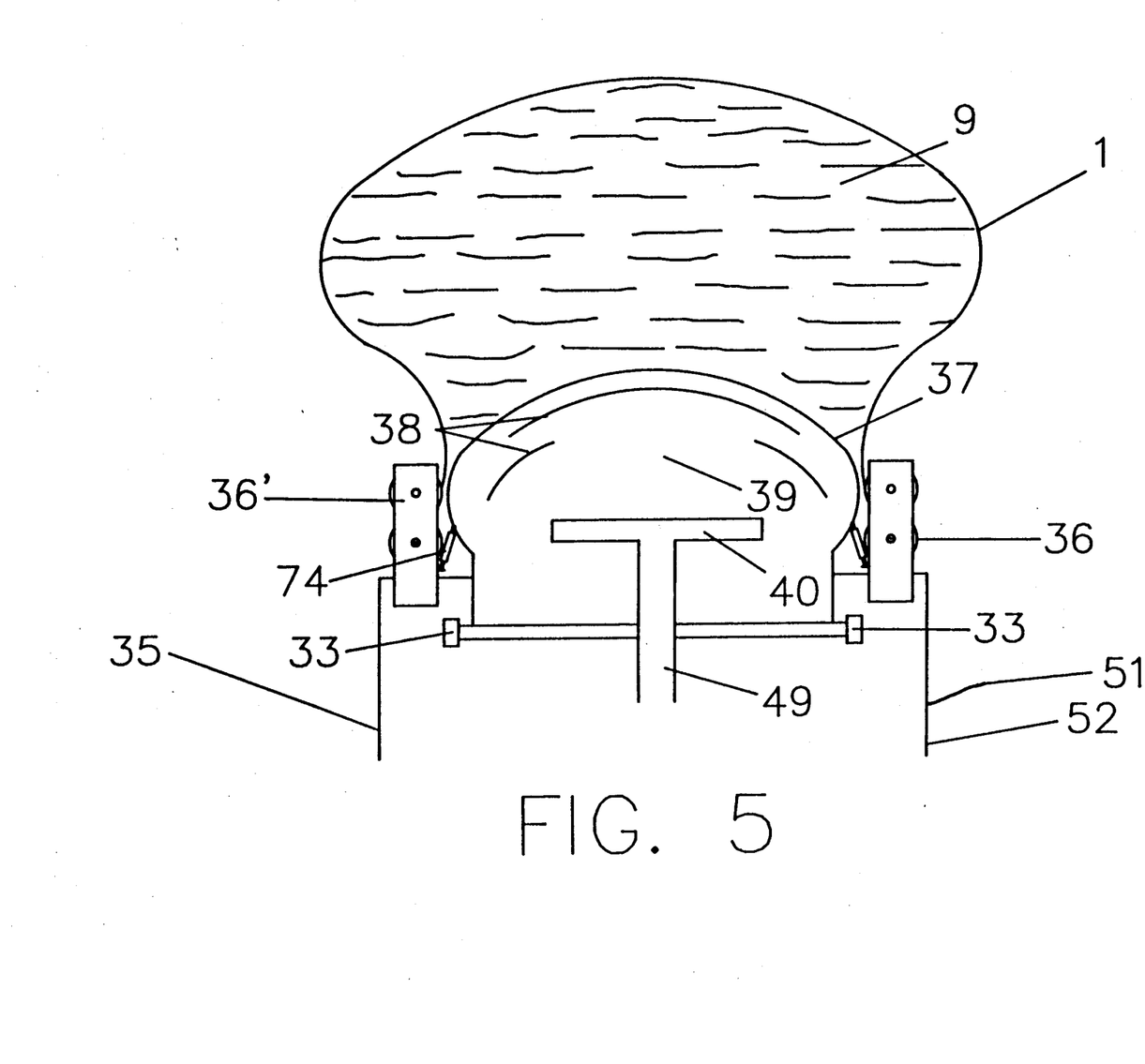
FIG. 5 is a plan view showing a diagrammatic representation of the front portion of the petroleum recovery apparatus of the present invention in use.
Figure 6:
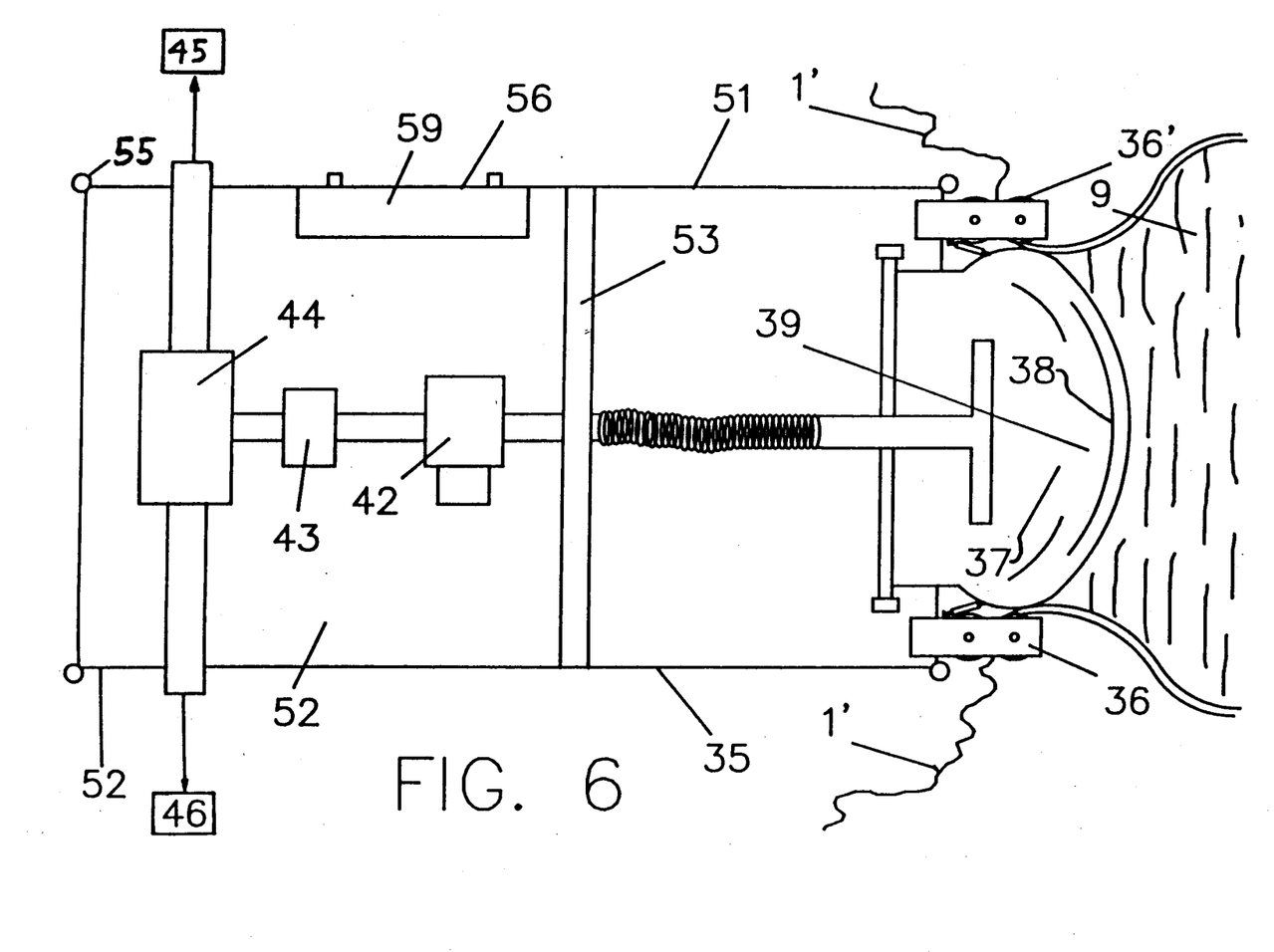
FIG. 6 is a plan view showing a diagrammatic representation of the entire petroleum recovery apparatus of FIG. 5.
Figure 7:
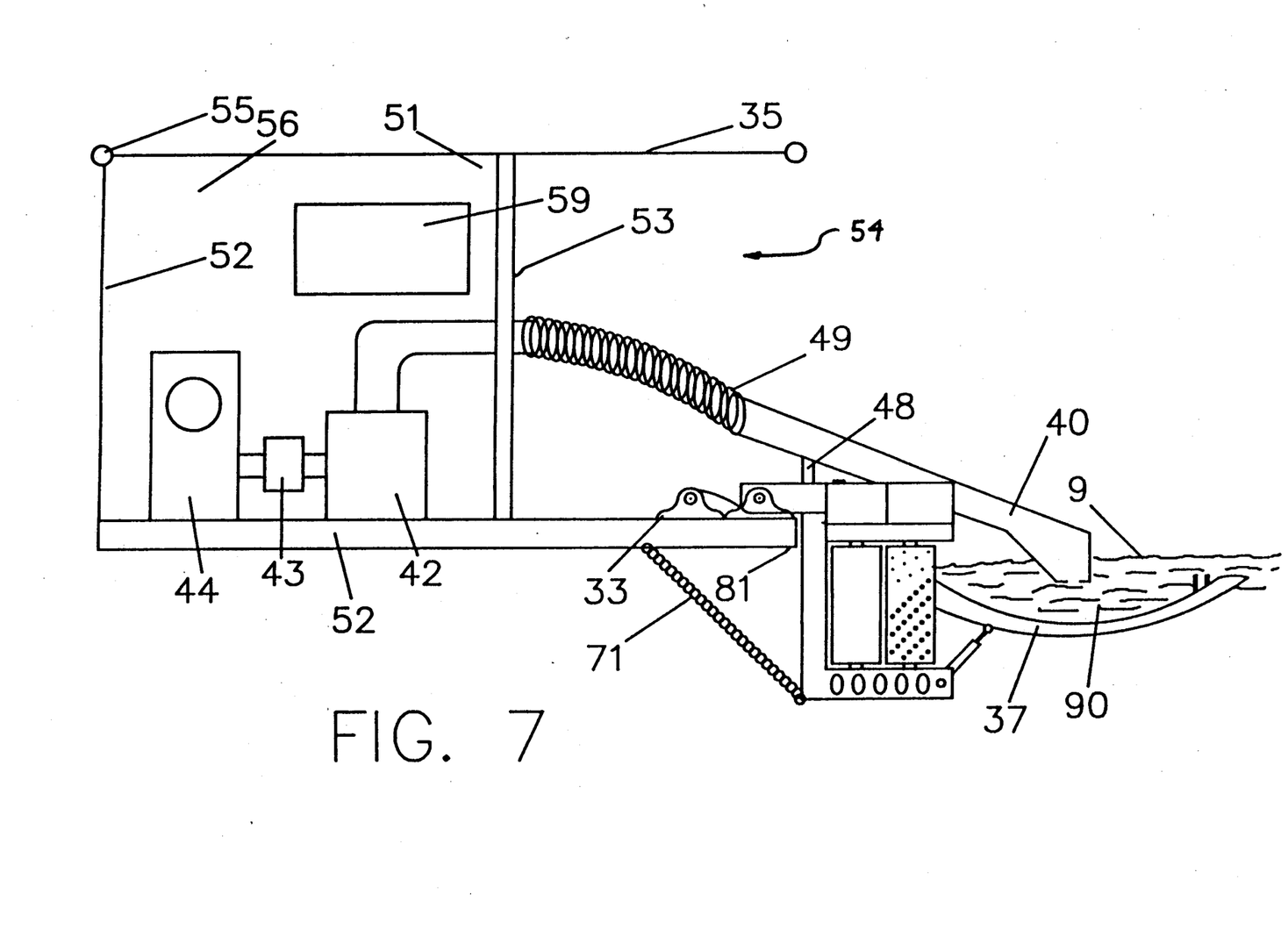
FIG. 7 is a side elevation of a diagrammatic representation of the petroleum recovery apparatus shown in FIG. 6.

Turning first to FIGS. 5 through 7, the major components of the recovery apparatus 35 are shown in detail. The recovery apparatus 35 is designed to be positioned slightly above sea-level so that proper operation of the apparatus is readily achieved. Therefore, it is desireable that the apparatus be positioned on a platform attached to a ship and located approximately at sea level or on a barge or some other floatation vessel which provides for operation close to the surface of the water. The apparatus is contained within container 51, such as a containerized freight container, having exterior top, bottom and side surfaces 52 and interior wall 53 which completely encase the important mechanical and electrical components of the apparatus. The front end of the container 51 is provided with an adjustable petroleum recovery pan 37 which is pivotally attached to the front edge of the container by pivot 33. The pan has a series of baffles 38 on the front edge thereof to reduce the turbulence of the petroleum product flowing into the pan. The center portion of the recovery pan is provided with a deep depression 39 that allows a significant amount of petroleum product to collect or pool therein so that efficient pumping of this product out of the recovery pan can be achieved. The quantity of "pooled" product 90 is a function of the perimeter of the pan in contact with the petroleum product and the of the edge of the recovery pan in relation to the petroleum product/air interface. It is important to note that the recovery pan should always be positioned above the water/spilled petroleum product interface so that water does not enter into the pan. The position of the recovery pan is controlled by an input from a sensor means 85 which will be described in detail hereinafter.

Two roller assemblies 36, 36' are also pivotally connected to the front edge of the container 51, adjacent the recovery pan 37, so that both components can be stored completely inside the container when not in use and readily pivoted into an in use position when desired. A pair of hydraulic actuators or pistons 74 are connected between the bottom portion of the framework 62 of the roller assemblies and the bottom of the recovery pan 37, as can best be seen in FIG. 9, and the position of the recovery pan is controlled by the sensor means 85.

Positioned inside the recovery pan, adjacent the bottom of depression 39, is a nozzle having a downwardly directed inlet for recovering petroleum product. The other end of the nozzle 40 is attached to a hose which, in turn, is connected to a high-volume pump 42 that provides the necessary pumping action. The nozzle 40 and hose 49 are held in position by bracket 48. The discharge of pump 42 passes through water sensor 43 and into product separator 44 comprising a flow valve that diverts the product into one of two storage containers 45, 46 depending upon the purity of the recovered product. When essentially pure petroleum product 9 is being recovered, it is routed through the product separator 44 to pure product storage container 46, such as an on-site vessel where the product is stored for future shipping and/or resale. If during the pumping operation, the water sensor 43 detects unpure product 9, i.e., product containing water, the sensor sends a signal to the flow valve of the product separator 44 which diverts the recovered product to contaminated storage container 45, such as a second on-site ship or other large capacity storage container where such product is accumulated for further processing or disposal.

Figure 8:
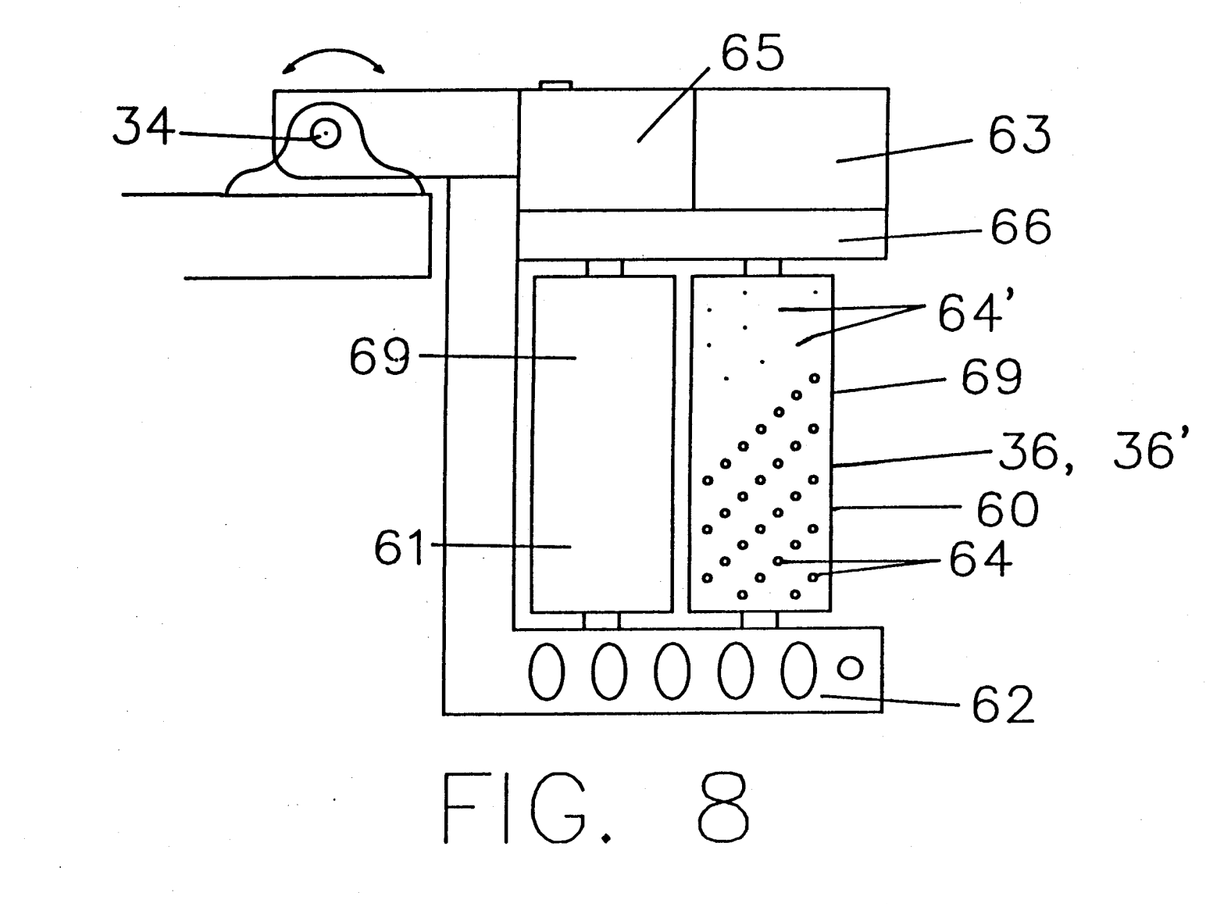
FIG. 8 is a side elevation showing a diagrammatic representation of petroleum product recovery using the recovery pan.
Figure 9:
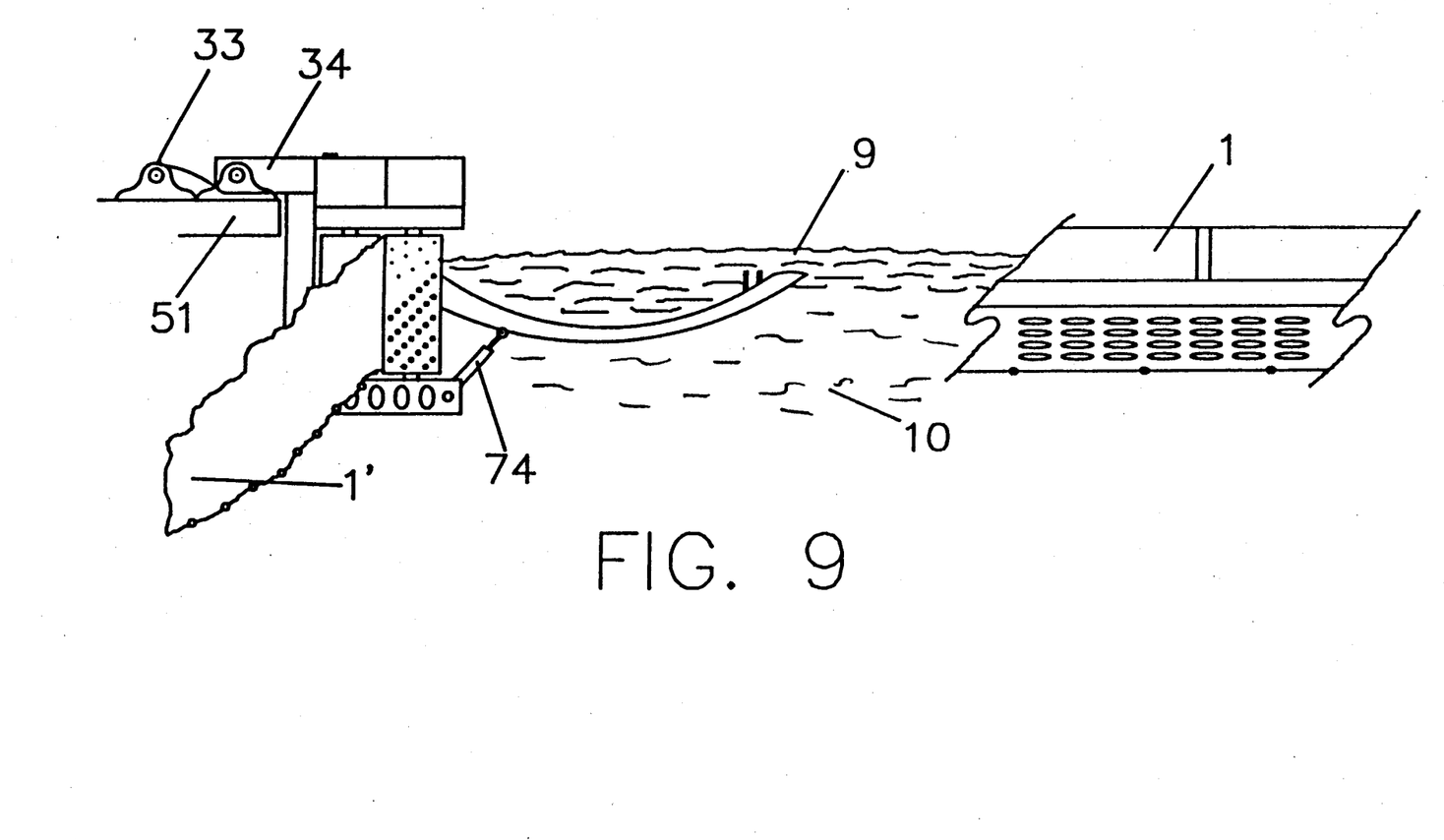
FIG. 9 is a diagrammatic representation showing a cross-sectional view of the petroleum recovery pan and nozzle.
Figure 10:
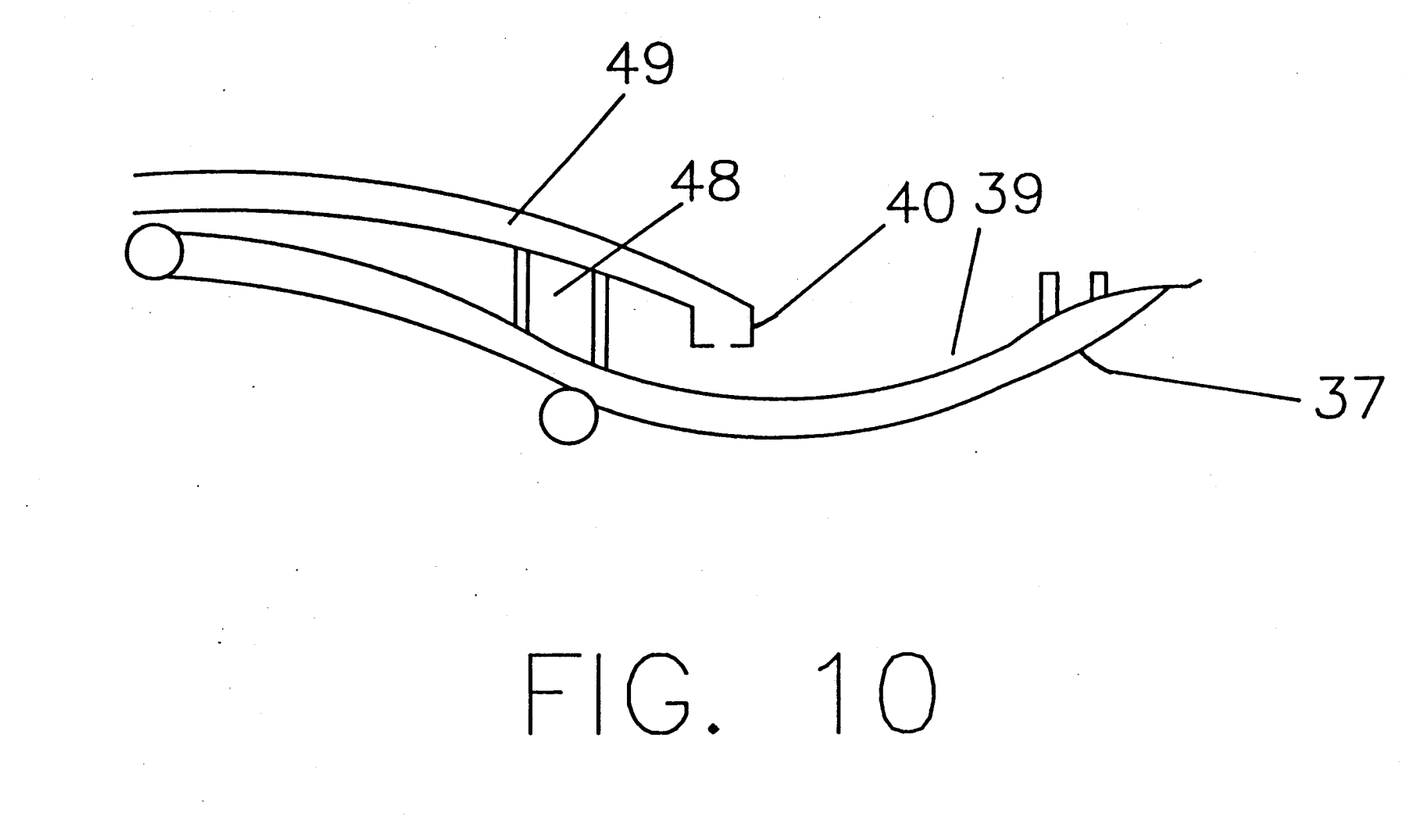
FIG. 10 is a diagrammatic representation showing a cross-sectional view of the petroleum recovery pan.
Figure 11:
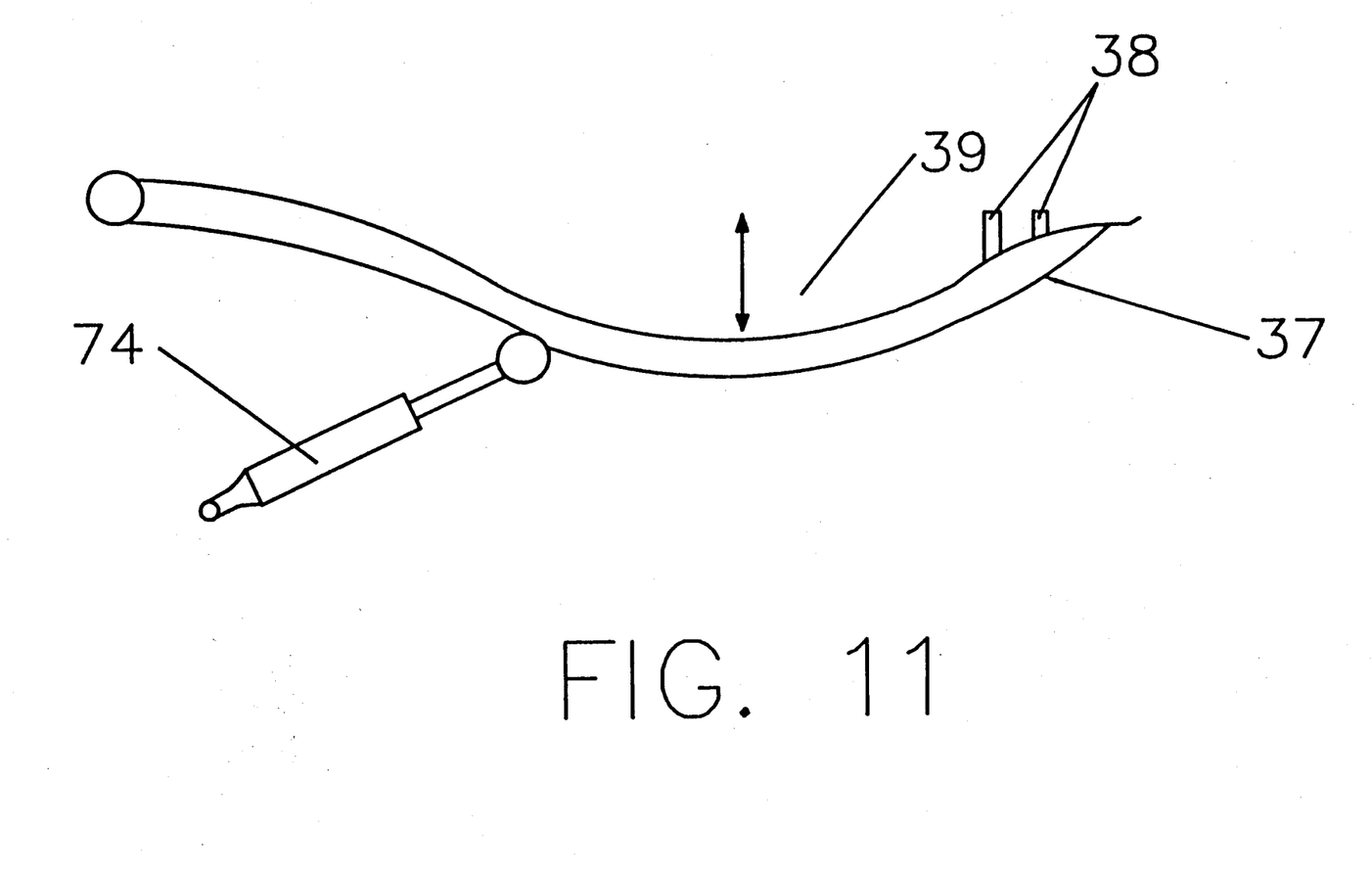
FIG. 11 is a diagrammatic representation showing an arrangement for determining the height of the spilled petroleum product contained within the containment barrier.

Turning now to FIG. 8, a detailed description of the containment barrier control roller assemblies 36, 36' will now be provided. The petroleum recovery apparatus 35 is provided with a pair of control roller assemblies 36, 36' one provided on each side of the recovery pan 37. The roller assemblies 36, 36' are pivotally attached at 34 to the base of the container 51 and a major portion of the assembly is positioned below the water, when in use. Each roller assembly 36, 36' consists of a traction and an idler roller. The traction roller 60 is preferably provided with a neoprene-like surface 69 and has a plurality of raised molded studs 64, provided on its exterior surface, for firmly gripping the containment barrier 1 and winching it through the apparatus 36, 36'. The top couple of rows of studs on traction roller 60 are sharp pointed steel studs 64' which puncture the inflated chamber 2 of the containment barrier 1 as it is winched through the roller apparatus 36, 36'. Idler roller 61 also has a neoprene-like surface 69 and this roller is biased (spring, hydraulically, etc.) against the surface of traction roller 60 to provide the necessary traction between the two rollers and insures positive feeding of the containment barrier 1 through the roller assembly 36, 36'. A suitable drive for each traction roller 60 is provided via bidirection motor 63 connected to gear box 66. The rotational speed and direction of the motors 60 are controlled by control interfaces 65. Each roller is provided with a pair of suitable bearings (not shown), one on each end of the rollers, which are able to function acceptably in aqueous as well as salt water environments. The entire roller assembly is fabricated to be sea-proof as well as explosion-proof.

The framework 62 must be able to withstand very high forces when controlling the overall perimeter of the containment barrier 1, but should be lightweight, if possible. The framework may be provided with plurality of holes 68 which reduce the overall weight of the framework but do not materially alter its strength. In addition, support members such as chain 71 may connect the lower portion of the framework 62 to the bottom of the container 51 to maintain the assembly in its working position.

The pooled petroleum product 90 is pumped through the nozzle 40, hose 49 and pump 42 into water sensing means 43, such as a magnetic flowmeter sold by the Foxboro Co. of Massachusetts, which is able to indicate a change in flow characteristics caused by the presence of any water in the recovered product and based upon this indication, a signal will be provided to the flow valve, via the microprocessor control system 59, so that the recovered product is pumped to one of the storage containers 45, 46. The equipment used to pump the product from the recovery pan to the storage containers must be properly sized so that it does not limit the recovery process and efficient recovery is achieved. It is anticipated that the disclosed equipment will be able to recover and pump at least 2000 gallons per hour of petroleum product, preferably in excess of 5000 gallons per hour.

The roller assembly 36, 36' in combination with petroleum sensor means 75, to be described in detail hereinafter, are used to concentrate and maintain a sufficient head of spilled petroleum product 9 so that an efficient product recovery can be achieved. This is achieved by attaching one end of the continuous containment barrier 1 to a first roller apparatus 36 and then attaching the opposite end of the continuous containment barrier 1 to the second roller assembly 36' and then activating the respective motors 63 to winch in the necessary amount of containment barrier so that the area of the barrier is reduced and petroleum product is thereby constricted and concentrated. As the inflatable chambers 2 pass through the roller assemblies 36, 36' they are pierced by pointed studs 64' and deflated. The deflated barrier 1' may thereafter be either recovered or allowed to sink to the bottom of the body of water.

Figure 12:
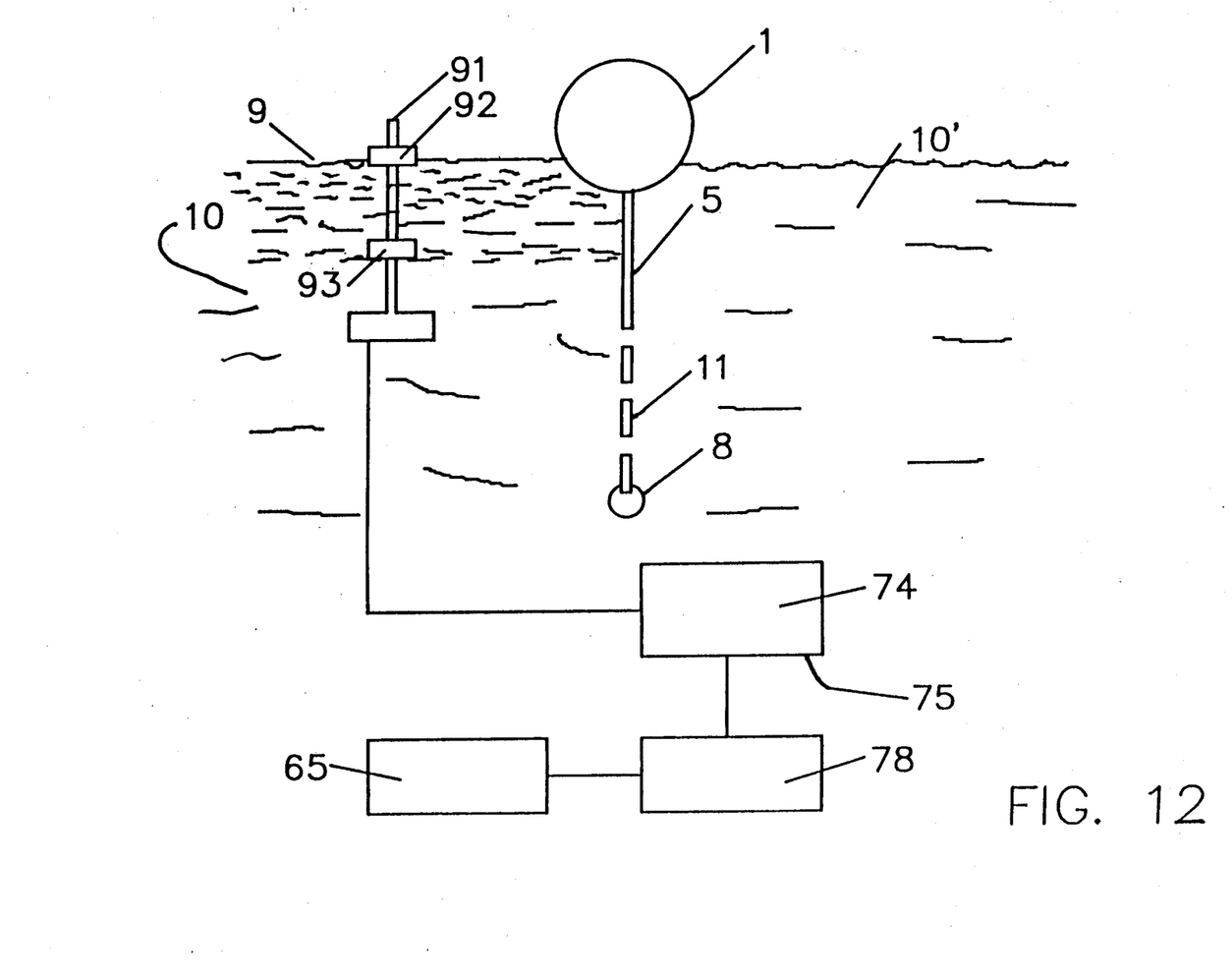
FIG. 12 is a diagrammatic representation showing an arrangement for determining the position of the spilled petroleum product/water interface to achieve proper positioning of the recovery pan.
Figure 13:
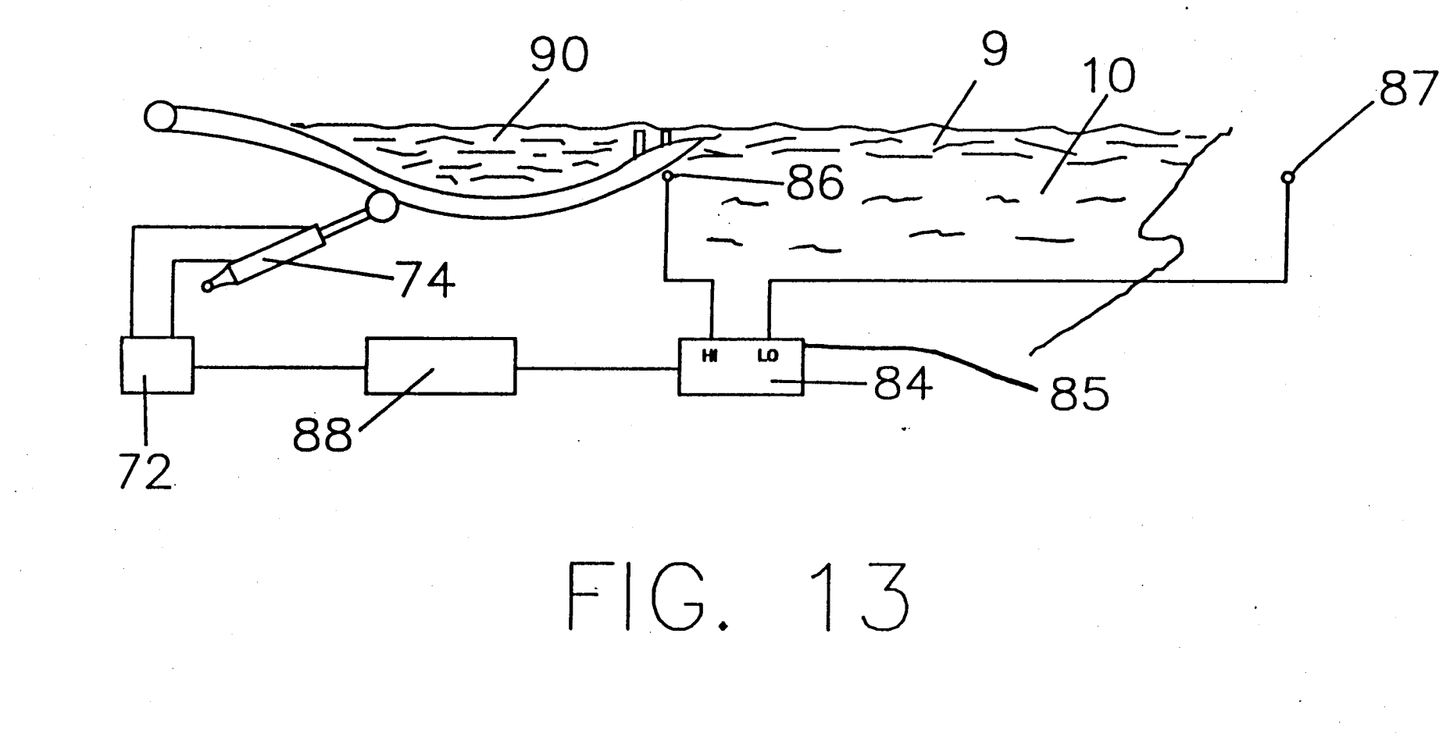

The petroleum sensor means 75, as shown in FIG. 12, is used to determine the level of the water 10 and the spill petroleum product 9 inside the containment barrier 1 so that the height of spilled petroleum product 9 can be readily determined. The petroleum sensor means 75 comprises a sensor probe 91 which is positioned inside the containment barrier and maintained at a constant height. The probe 91 is fabricated from stainless steel or some other suitable material for an aqueous environment and contains a matrix of position indicating reed switches. Two floats 92, 93 are affixed to the probe 91 in a manner which allows motion of the floats along the exterior surface of the probe. Float 93 is constructed of a buoyant material designed to float on an aqueous environment while float 92 is constructed of a buoyant material that floats on spilled petroleum product. It is to be noted that the material chosen to be float 92 will be dependent upon the specific gravity of the petroleum product being recovered. Both of the floats 92, 93 contain magnets which actuate the reed switches within the probe and relay positional information to controller 74. There, the positions of floats 92 and 93 are interpreted and the differential position is calculated and output as an analog input to a microprocessor base control system 78 which generates an output to control interface 65 which either causes more barrier material to be winched in by the roller assemblies 36, 36' or reverses the motors 63 and winches back out previously winched in barrier material 1' so as to relieve any excess pressure generated by the petroleum product and/or the environment.

The purpose of the petroleum sensor means 75 is to determine the height of the increased head of spilled petroleum product so that efficient recovery can be achieved. There are a variety of ways to determine the height of petroleum product floating on the water surface such as using ultra sound distance measurements, conductivity probes to sense the level of the water, pressure measurements based upon an absolute pressure and mechanical floats driving position indicating devices. These and other sensing means are also considered within the spirit and scope of the invention herein involved since such devices will indicate the height of petroleum product floating on the surface.

The recovery apparatus 35 is provided with a control system which is used to determine and maintain the recovery pan 37 at a desired level by controlling its position via hydraulic rams 74, one positioned on each side of the recovery pan. The object of the control system is to maintain the recovery pan slightly about the petroleum/water interface. The recovery pan is preferably positioned a couple of inches or so above the interface to insure that water is not collected.

One method of achieving this is by using a differential pressure transmitter 84 which compares the relative pressures of the high pressure tap 86, position near the top edge of the recovery pan, and the low pressure tap 87 position outside the perimeter of the containment barrier, e.g., outside the containment barrier on one of the roller assemblies. These taps should also be at the same height, however, the high pressure tap 86 can be adjustably mounted to be slidable along the underside of the recovery pan 37. The differential output from the transmitter 84 is inputted to a microprocessor controller 88 which, depending upon the petroleum product level, controls a pump 72 that supplies the hydraulic fluid to hydraulic actuators 74 to provide the necessary height adjustment of the recovery pan 37 relative to the product/water interface. The microprocessor controller 88 can also be used to maintain the recovery pan at a desired location even when turbulent conditions exist. This is achieved by adjusting the recovery pan 37, and its pressure tap 86, to try to maintain a zero pressure differential with respect to the low pressure tap 87. The adjustability of the high pressure tap 86 provides the necessary adjustments so that when a zero differential pressure is measured, the lip of recovery pan will be positioned above the petroleum/water interface. The other sensor means previously discussed could also be used. Alternatively, providing a recovery pan which floats at desire level in the developed head, via adjustable floatation members, is also possible.

As the spilled petroleum product enters into the recovery pan, the baffles 38 minimizes the turbulence so that the resultant pool of product 90 contains a minimal amount of air and is ready for recovery. The petroleum recovery apparatus 35 is securely fastened to an operating platform 81 of a ship and held there by hold down rings or other attachment means 55.

The entire petroleum recovery apparatus 35 is designed to be used in an environment that is "AWASH" (level with the sea) and is, therefore, constructed to be sea-tight and minimize the occurrence of an explosion. It is anticipated that seawater will wash into compartment 54 on a regular basis and thus the interior wall 53 is constructed of an extra heavy duty, reinforced design so as to withstand the substantial impact of the waves. The control compartment 56 containing the microprocessor controls and the other electrical and mechanical components is designed to minimize the occurrence of an explosion and such design is well-known is thus not described in further detail. The control system shall have the capability to maintain substantial records regarding the controlled environment and the progress toward recovering the spilled product.

SUMMARY OF OPERATION

When a petroleum spill occurs, the containment barrier deployment apparatus is first put into operation to manufacture the continuous containment barrier on-site. The apparatus takes raw bondable material and fabricates, inflates, ballasts and fully deploys a custom length containment barrier 1. Once the containment barrier 1 has been completely deployed around the spill, the petroleum recovery apparatus 35 is properly positioned and the two ends of the containment barrier are attached to the respective roller assemblies 36, 36'.

After connection, the petroleum sensor means 75 begins to establish and maintain a desired height of spilled petroleum product inside the containment barrier. When the petroleum product height stabilizes, the interface sensor means 85 commences operation to position the recovery pan 37 at a suitable position slightly above the petroleum/water interface and the recovery process is then initiated. The pool of product 90 is pumped from the recovery pan 37, via the nozzle 40 and hose 49, through high-volume pump 42, water sensor 43 and product separator 44 into an appropriate storage container 45, 46.

Since certain changes made in the above containment barrier and apparatus for the manufacture thereof, without departing from the spirit and scope of the invention herein involved, it is intended that all matter contained in the above-description as shown in the accompanying drawings shall be interpreted in an illustrative and not in the limiting sense.

Wherefore, I claim:

1. An apparatus for manufacturing an elongate unitary containment barrier comprising:
    (a) supply means for supplying a continuous elongate strip of weldable material to the apparatus;
    (b) conveying means for conveying said strip from said supply means through the apparatus;
    (c) folding means for folding one edge of said strip conveyed by said conveying means upon itself;
    (d) elongate seaming means for forming an elongate air tight seam in said strip conveyed by said conveying means along the one edge of said strip folded over by said folding means to form a tubular portion along that edge;
    (e) inflation means extending within the folded over edge of said strip formed by said folding means for inflating and pressurizing said tubular portion;
    (f) transverse seaming means for forming air tight transverse seams, at discrete intervals, in the tubular portion inflated by said inflation means thereby forming a plurality of separate inflated compartments; and
    (g) means for attaching weights to said strip conveyed by said conveying means adjacent the edge thereof remote from the tubular portion.

2. An apparatus according to claim 1, wherein said apparatus further includes aperture producing means for forming a plurality of apertures in said strip conveyed by said conveying means remote from said tubular portion.

3. An apparatus according to claim 1, wherein said inflation means includes baffle means, positioned adjacent an exhaust thereof, for maintaining the inflation and pressurization of the tubular portion during formation of the transverse seams.

4. An apparatus according to claim 2, wherein said aperture producing means produces a series of apertures in said strip conveyed by said conveying means remote from the tubular portion such that at least one longitudinally extending reinforcing strip remains in said strip to provide longitudinal strength to the floatation containment barrier manufactured thereby.

5. An apparatus according to claim 1, wherein said apparatus is carried by a ship and further includes means for deploying the containment barrier formed by the apparatus into the water.

* * * * *